(12) United States Patent
Onggosanusi et al.

(10) Patent No.: US 11,228,393 B2
(45) Date of Patent: *Jan. 18, 2022

(54) METHOD AND APPARATUS FOR CHANNEL QUALITY INDICATOR (CQI) AND CHANNEL STATE INFORMATION (CSI) REPORTING

(71) Applicant: Samsung Electronics Co., Ltd., Suwon-si (KR)

(72) Inventors: Eko Onggosanusi, Coppell, TX (US); Md Saifur Rahman, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

This patent is subject to a terminal disclaimer.

(21) Appl. No.: 16/792,663

(22) Filed: Feb. 17, 2020

(65) Prior Publication Data

US 2020/0186281 A1 Jun. 11, 2020

Related U.S. Application Data

(63) Continuation of application No. 16/052,457, filed on Aug. 1, 2018, now Pat. No. 10,567,113.

(Continued)

(51) Int. Cl.
*H04L 12/26* (2006.01)
*H04L 1/00* (2006.01)
(Continued)

(52) U.S. Cl.
CPC ......... *H04L 1/0026* (2013.01); *H04B 7/0486* (2013.01); *H04B 7/0626* (2013.01);
(Continued)

(58) Field of Classification Search
None
See application file for complete search history.

(56) References Cited

U.S. PATENT DOCUMENTS 8,948,799 B1 2/2015 Xu et al.
2013/0322376 A1* 12/2013 Marinier ............... H04W 72/06
370/329

(Continued)

OTHER PUBLICATIONS

European Patent Office, "Communication pursuant to Article 94(3) EPC", dated Mar. 12, 2021, in connection to European Patent Application No. 18845123.1, 8 pages.

(Continued)

*Primary Examiner* — Zewdu A Beyen

(57) ABSTRACT

Methods and apparatuses for channel state information (CSI) and channel quality indicator (CQI) reporting. A UE includes a transceiver configured to receive configuration information for reporting the CSI and a processor operably connected to the transceiver. The processor is configured to decode the configuration information and calculate the CSI. The transceiver is further configured to transmit the CSI including the CQI. The configuration information includes a selection of a CQI table and a target block error rate (BLER). A base station (BS) includes a processor configured to generate configuration information for a CSI reporting and a transceiver operably connected to the processor. The transceiver is configured to transmit, to a UE, the configuration information and receive, from the UE, a CSI report that includes a CQI. The configuration information includes a selection of a CQI table and a BLER.

15 Claims, 10 Drawing Sheets

Related U.S. Application Data

(60) Provisional application No. 62/615,285, filed on Jan. 9, 2018, provisional application No. 62/544,387, filed on Aug. 11, 2017.

(51) Int. Cl.
*H04B 7/0456* (2017.01)
*H04L 5/00* (2006.01)
*H04B 7/06* (2006.01)
*H04L 1/20* (2006.01)
*H04W 24/10* (2009.01)
*H04W 72/04* (2009.01)

(52) U.S. Cl.
CPC ......... *H04B 7/0632* (2013.01); *H04L 1/0003* (2013.01); *H04L 1/0016* (2013.01); *H04L 1/203* (2013.01); *H04L 5/0048* (2013.01); *H04L 5/0053* (2013.01); *H04L 5/0057* (2013.01); *H04W 24/10* (2013.01); *H04W 72/0413* (2013.01); *H04L 5/005* (2013.01)

(56) References Cited

U.S. PATENT DOCUMENTS

| | | |
|---|---|---|
| 2015/0124901 A1 | 5/2015 | Xu et al. |
| 2015/0257090 A1 | 9/2015 | Chen et al. |
| 2016/0211904 A1 | 7/2016 | Kim et al. |
| 2018/0049047 A1* | 2/2018 | Lin ................. H04W 24/02 |
| 2018/0175993 A1* | 6/2018 | Onggosanusi ....... H04B 7/0486 |

OTHER PUBLICATIONS

Samsung, "CSI Parameters and Multiplexing", 3GPP TSG RAN WG1 NR Ad-Hoc#2, Jun. 27-30, 2017, R1-1710672, 4 pages.
Communication pursuant to Article 94(3) EPC dated Oct. 28, 2020 in connection with European Patent Application No. 18 845 123.1, 7 pages.
Office Action dated Dec. 1, 2020 in connection with Korean Patent Application No. 10-2020-7007275, 10 pages.
AT&T, "Remaining issues in the codeword-to-layer mapping for NR MIMO", 3GPP TSG RAN WG1 Meeting #88bis, Apr. 3-7, 2017, R1-1704335, 12 pages.
Supplementary European Search Report dated Apr. 14, 2020 in connection with European Patent Application No. 18 84 5123, 9 pages.
Notice of Grant of Patent dated Jun. 16, 2021 in connection with Korean Patent Application No. 10-2020-7007275, 17 pages.

* cited by examiner

METHOD AND APPARATUS FOR CHANNEL QUALITY INDICATOR (CQI) AND CHANNEL STATE INFORMATION (CSI) REPORTING

CROSS-REFERENCE TO RELATED APPLICATIONS AND CLAIM OF PRIORITY

This application is a continuation of U.S. patent application Ser. No. 16/052,457, filed Aug. 1, 2018, which claims the benefit of U.S. Provisional Patent Application No. 62/544,387 filed Aug. 11, 2017; and U.S. Provisional Patent Application No. 62/615,285 filed Jan. 9, 2018. The above-identified provisional patent applications are hereby incorporated by reference in their entirety.

TECHNICAL FIELD

The present disclosure relates generally to methods for channel quality indication (CQI) reporting.

BACKGROUND

Wireless communication has been one of the most successful innovations in modern history. The demand of wireless data traffic is rapidly increasing due to the growing popularity among consumers and businesses of smart phones and other mobile data devices, such as tablets, "note pad" computers, net books, eBook readers, and machine type of devices. To meet the high growth in mobile data traffic and support new applications and deployments, improvements in radio interface efficiency and coverage is of paramount importance.

A mobile device or user equipment can measure the quality of the downlink channel and report this quality to a base station so that a determination can be made regarding whether or not various parameters should be adjusted during communication with the mobile device. Existing channel quality reporting processes in wireless communications systems do not sufficiently accommodate reporting of channel state information associated with large, two dimensional array transmit antennas or, in general, antenna array geometry which accommodates a large number of antenna elements.

SUMMARY

Various embodiments of the present disclosure provide methods and apparatuses for CQI reporting.

In one embodiment, a UE is provided. The UE includes a transceiver and a processor operably connected to the transceiver. The transceiver is configured to receive configuration information for reporting CSI. The processor is configured to decode the configuration information and calculate the CSI. The transceiver is further configured to transmit the CSI including a CQI. The configuration information includes a selection of a CQI table and a target block error rate (BLER).

In another embodiment, a base station (BS) is provided. The BS includes a processor and a transceiver operably connected to the processor. The processor is configured to generate configuration information for a CSI reporting. The transceiver is configured to transmit, to a UE, the configuration information and receive, from the UE, a CSI report that includes a CQI. The configuration information includes a selection of a CQI table and a BLER.

In yet another embodiment, a method for operating a UE is provided. The method includes receiving and decoding configuration information for reporting CSI. The method also includes calculating and transmitting the CSI including a CQI. The configuration information includes a selection of a CQI table and a BLER.

The present disclosure relates to a pre-5th-Generation (5G) or 5G communication system to be provided for supporting higher data rates Beyond 4th-Generation (4G) communication system such as Long Term Evolution (LTE).

Other technical features may be readily apparent to one skilled in the art from the following figures, descriptions, and claims.

Before undertaking the DETAILED DESCRIPTION below, it can be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller can be implemented in hardware or a combination of hardware and software and/or firmware. The functionality associated with any particular controller can be centralized or distributed, whether locally or remotely. The phrase "at least one of," when used with a list of items, means that different combinations of one or more of the listed items can be used, and only one item in the list can be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
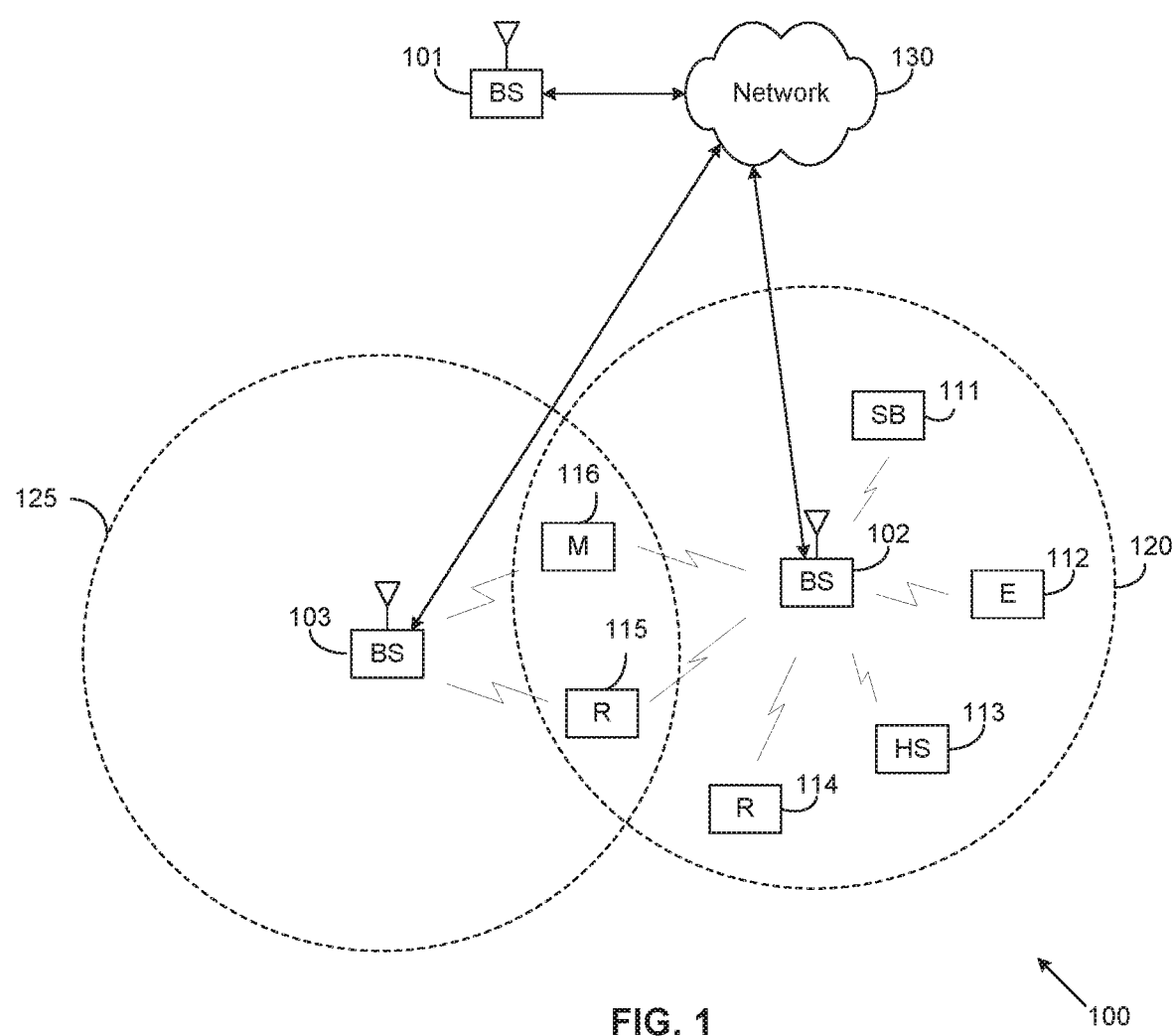
FIG. 1 illustrates an example wireless network according to various embodiments of the present disclosure.

FIGS. 1 through 11, discussed below, and the various embodiments used to describe the principles of the present disclosure in this patent document are by way of illustration only and should not be construed in any way to limit the scope of the disclosure. Those skilled in the art will understand that the principles of the present disclosure can be implemented in any suitably arranged wireless communication system.

LIST OF ACRONYMS

2D: two-dimensional
MIMO: multiple-input multiple-output
SU-MIMO: single-user MIMO
MU-MIMO: multi-user MIMO
3GPP: 3rd generation partnership project
LTE: long-term evolution
UE: user equipment
eNB: evolved Node B or "eNB"
BS: base station
DL: downlink
UL: uplink
CRS: cell-specific reference signal(s)
DMRS: demodulation reference signal(s)
SRS: sounding reference signal(s)
UE-RS: UE-specific reference signal(s)
CSI-RS: channel state information reference signals
SCID: scrambling identity
MCS: modulation and coding scheme
RE: resource element
CQI: channel quality information
PMI: precoding matrix indicator
RI: rank indicator
MU-CQI: multi-user CQI
CSI: channel state information
CSI-IM: CSI interference measurement
CoMP: coordinated multi-point
DCI: downlink control information
UCI: uplink control information
PDSCH: physical downlink shared channel
PDCCH: physical downlink control channel
PUSCH: physical uplink shared channel
PUCCH: physical uplink control channel
PRB: physical resource block
RRC: radio resource control
AoA: angle of arrival
AoD: angle of departure The following documents and standards descriptions are hereby incorporated by reference into the present disclosure as if fully set forth herein: 3GPP Technical Specification (TS) 36.211 version 12.4.0, "E-UTRA, Physical channels and modulation" ("REF 1"); 3GPP TS 36.212 version 12.3.0, "E-UTRA, Multiplexing and Channel coding" ("REF 2"); 3GPP TS 36.213 version 12.4.0, "E-UTRA, Physical Layer Procedures" ("REF 3"); 3GPP TS 36.321 version 12.4.0, "E-UTRA, Medium Access Control (MAC) Protocol Specification" ("REF 4"); 3GPP TS 36.331 version 12.4.0, "E-UTRA, Radio Resource Control (RRC) Protocol Specification" ("REF 5"); 3GPP Technical Specification (TS) 38.211 version 15.0.0, "NR, Physical channels and modulation" ("REF 6"); 3GPP TS 38.212 version 15.0.0, "NR, Multiplexing and Channel coding" ("REF 7"); 3GPP TS 38.213 version 15.0.0, "NR, Physical Layer Procedures for Control" ("REF 8"); 3GPP TS 38.214 version 15.0.0, "NR, Physical Layer Procedures for Data" ("REF 9"); 3GPP TS 38.321 version 15.0.0, "NR, Medium Access Control (MAC) Protocol Specification" ("REF 10"); and 3GPP TS 38.331 version 15.0.0, "NR, Radio Resource Control (RRC) Protocol Specification" ("REF 11").

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

FIG. 1 illustrates an example wireless network 100 according to various embodiments of the present disclosure. The embodiment of the wireless network 100 shown in FIG. 1 is for illustration only. Other embodiments of the wireless network 100 could be used without departing from the scope of the present disclosure.

The wireless network 100 includes a base station (BS) 101, a BS 102, and a BS 103. The BS 101 communicates with the BS 102 and the BS 103. The BS 101 also communicates with at least one Internet Protocol (IP) network 130, such as the Internet, a proprietary IP network, or other data network. Instead of "BS", an option term such as "eNB" (enhanced Node B) or "gNB" (general Node B) can also be used. Depending on the network type, other well-known terms can be used instead of "gNB" or "BS," such as "base station" or "access point." For the sake of convenience, the terms "gNB" and "BS" are used in this patent document to refer to network infrastructure components that provide wireless access to remote terminals. Also, depending on the network type, other well-known terms can be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an gNB, whether the UE is a mobile device (such as a mobile telephone or smartphone) or is normally considered a stationary device (such as a desktop computer or vending machine).

The gNB 102 provides wireless broadband access to the network 130 for a first plurality of user equipments (UEs) within a coverage area 120 of the gNB 102. The first plurality of UEs includes a UE 111, which can be located in a small business (SB); a UE 112, which can be located in an enterprise (E); a UE 113, which can be located in a WiFi hotspot (HS); a UE 114, which can be located in a first residence (R); a UE 115, which can be located in a second residence (R); and a UE 116, which can be a mobile device (M) like a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 can communicate with each other and with the UEs 111-116 using 5G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, can have other shapes, including irregular shapes, depending upon the configuration of the gNBs and variations in the radio environment associated with natural and man-made obstructions.

As described in more detail below, one or more of gNB 101, gNB 102, and gNB 103 transmit measurement reference signals to UEs 111-116 and configure UEs 111-116 for CSI reporting as described in embodiments of the present disclosure. In various embodiments, one or more of UEs 111-116 receive Channel State Information Reference Signal (CSI-RS) and transmit Sounding Reference Signal (SRS).

Although FIG. 1 illustrates one example of a wireless network 100, various changes can be made to FIG. 1. For example, the wireless network 100 could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNB 101, 102, and/or 103 could provide access to other or additional external networks, such as external telephone networks or other types of data networks.

Figure 2A:
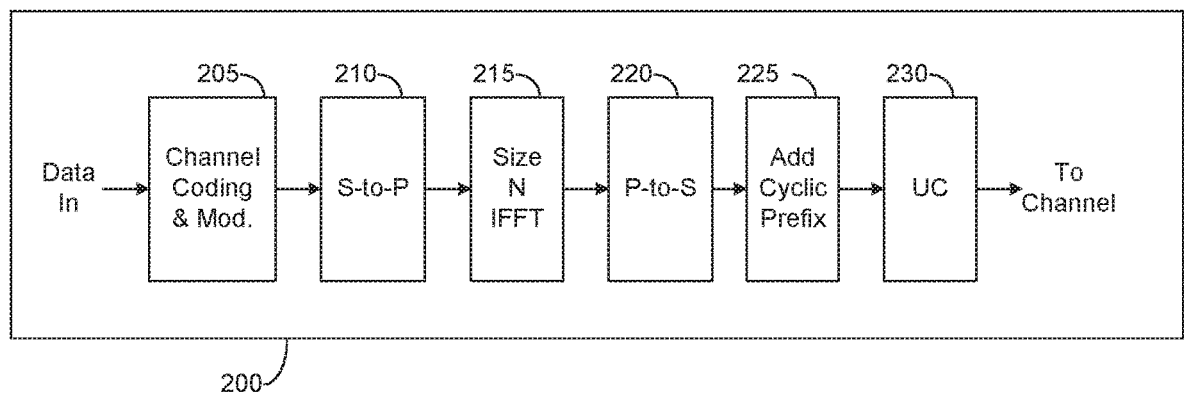
FIGS. 2A and 2B illustrate example wireless transmit and receive paths according to various embodiments of the present disclosure.
Figure 2B:
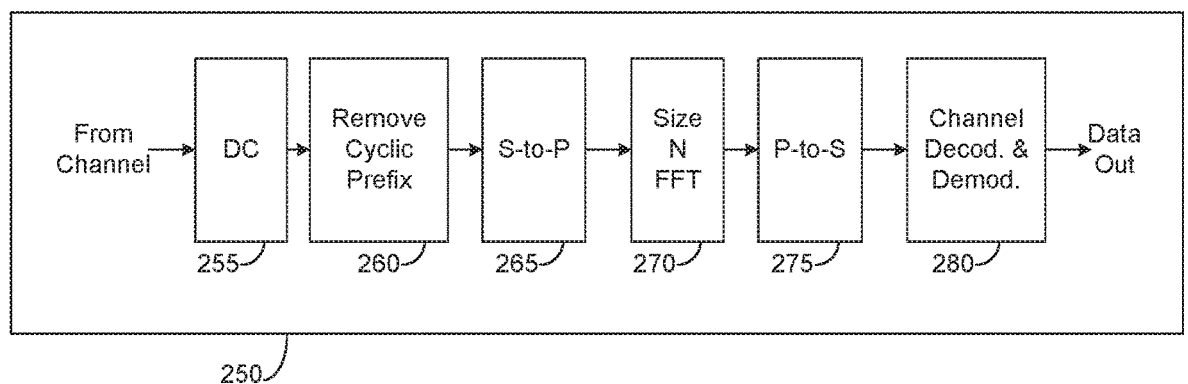

FIGS. 2A and 2B illustrate example wireless transmit and receive paths according to the present disclosure. In the following description, a transmit path 200 can be described as being implemented in a gNB (such as gNB 102), while a receive path 250 can be described as being implemented in a UE (such as UE 116). However, it will be understood that the receive path 250 could be implemented in a gNB and that the transmit path 200 could be implemented in a UE. In some embodiments, the receive path 250 is configured to receive CSI-RS and transmit SRS as described in embodiments of the present disclosure.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an 'add cyclic prefix' block 225, and an up-converter (UC) 230. The receive path 250 includes a down-converter (DC) 255, a 'remove cyclic prefix' block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as convolutional, Turbo, or low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The S-to-P block 210 converts (such as de-multiplexes) the serial modulated symbols to parallel data in order to generate N parallel symbol streams, where N is the IFFT/FFT size used in the gNB 102 and the UE 116. The size N IFFT block 215 performs an IFFT operation on the N parallel symbol streams to generate time-domain output signals. The P-to-S block 220 converts (such as multiplexes) the parallel time-domain output symbols from the size N IFFT block 215 in order to generate a serial time-domain signal. The 'add cyclic prefix' block 225 inserts a cyclic prefix to the time-domain signal. The UC 230 modulates (such as up-converts) the output of the 'add cyclic prefix' block 225 to an RF frequency for transmission via a wireless channel. The signal can also be filtered at baseband before conversion to the RF frequency.

A transmitted RF signal from the gNB 102 arrives at the UE 116 after passing through the wireless channel, and reverse operations to those at the gNB 102 are performed at the UE 116. The DC 255 down-converts the received signal to a baseband frequency, and the 'remove cyclic prefix' block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

As described in more detail below, the transmit path 200 or the receive path 250 can perform signaling for CSI reporting. Each of the gNBs 101-103 can implement a transmit path 200 that is analogous to transmitting in the downlink to UEs 111-116 and can implement a receive path 250 that is analogous to receiving in the uplink from UEs 111-116. Similarly, each of UEs 111-116 can implement a transmit path 200 for transmitting in the uplink to gNBs 101-103 and can implement a receive path 250 for receiving in the downlink from gNBs 101-103.

Each of the components in FIGS. 2A and 2B can be implemented using only hardware or using a combination of hardware and software/firmware. As a particular example, at least some of the components in FIGS. 2A and 2B can be implemented in software, while other components can be implemented by configurable hardware or a mixture of software and configurable hardware. For instance, the FFT block 270 and the IFFT block 215 can be implemented as configurable software algorithms, where the value of size N can be modified according to the implementation.

Furthermore, although described as using FFT and IFFT, this is by way of illustration only and should not be construed to limit the scope of the present disclosure. Other types of transforms, such as Discrete Fourier Transform (DFT) and Inverse Discrete Fourier Transform (IDFT) functions, could be used. It will be appreciated that the value of the variable N can be any integer number (such as 1, 2, 3, 4, or the like) for DFT and IDFT functions, while the value of the variable N can be any integer number that is a power of two (such as 1, 2, 4, 8, 16, or the like) for FFT and IFFT functions.

Although FIGS. 2A and 2B illustrate examples of wireless transmit and receive paths, various changes can be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Other suitable architectures could be used to support wireless communications in a wireless network.

Figure 3A:
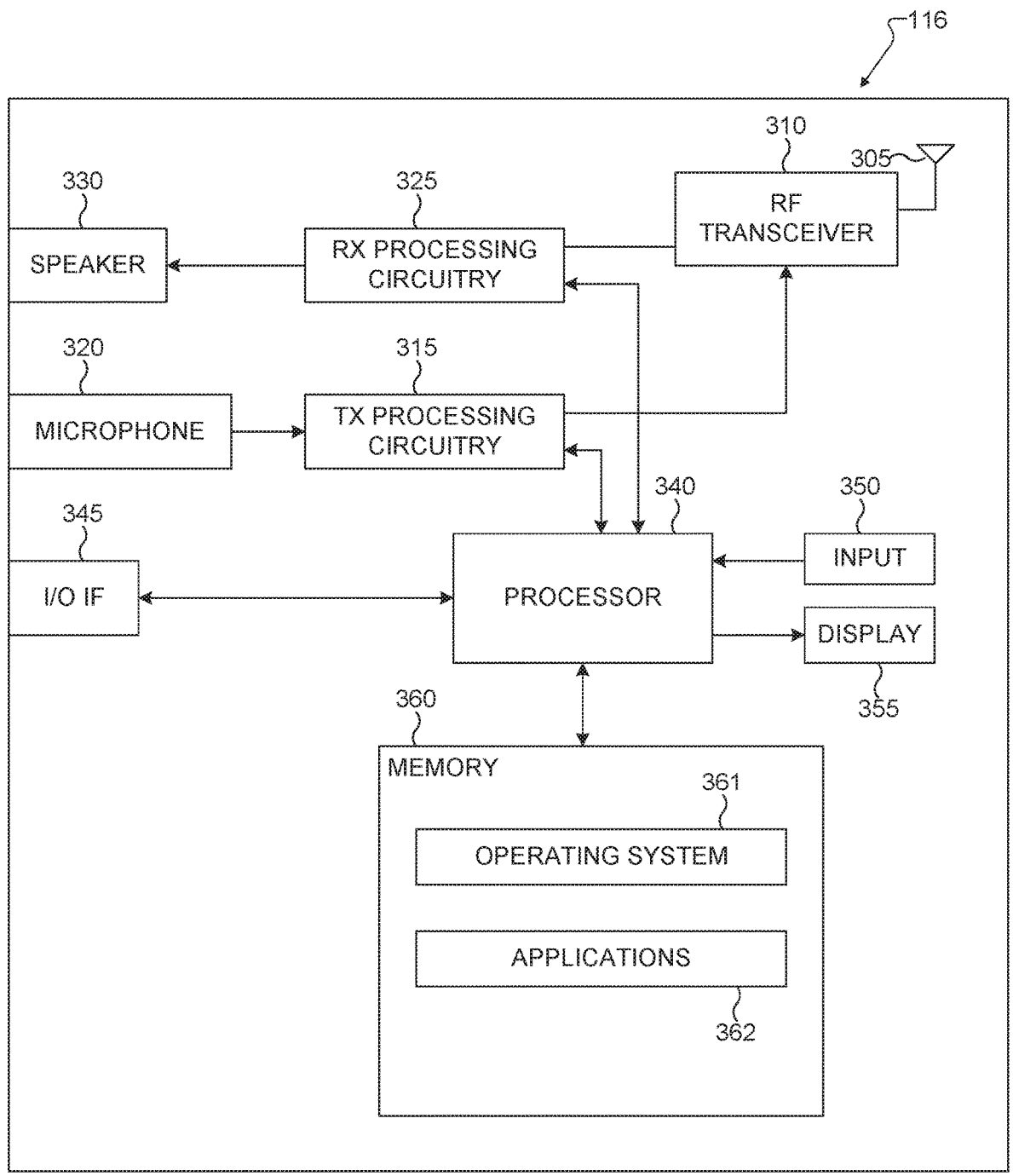
FIG. 3A illustrates an example user equipment according to various embodiments of the present disclosure.

FIG. 3A illustrates an example UE 116 according to the present disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of the present disclosure to any particular implementation of a UE.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a processor 340, an input/output (I/O) interface 345, an input 350, a display 355, and a memory 360. The memory 360 includes an operating system (OS) program 361 and one or more applications 362.

The RF transceiver 310 receives, from the antenna 305, an incoming RF signal transmitted by a gNB of the wireless network 100 of FIG. 1. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS program 361 stored in the memory 360 in order to control the overall operation of the UE 116. For example, processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as operations for CSI-RS reception and measurement for systems described in embodiments of the present disclosure as described in embodiments of the present disclosure. The processor 340 can move data into or out of the memory 360 as required by an executing process. In some embodiments, the processor 340 is configured to execute the applications 362 based on the OS program 361 or in response to signals received from gNBs or an operator. The processor 340 is also coupled to the I/O interface 345, which provides the UE 116 with the ability to connect to other devices such as laptop computers and handheld computers. The I/O interface 345 is the communication path between these accessories and the processor 340.

The processor 340 is also coupled to the input 350 (e.g., keypad, touchscreen, button etc.) and the display 355. The operator of the UE 116 can use the input 350 to enter data into the UE 116. The display 355 can be a liquid crystal display or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

As described in more detail below, the UE 116 can perform signaling and calculation for CSI reporting. Although FIG. 3A illustrates one example of UE 116, various changes can be made to FIG. 3A. For example, various components in FIG. 3A could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
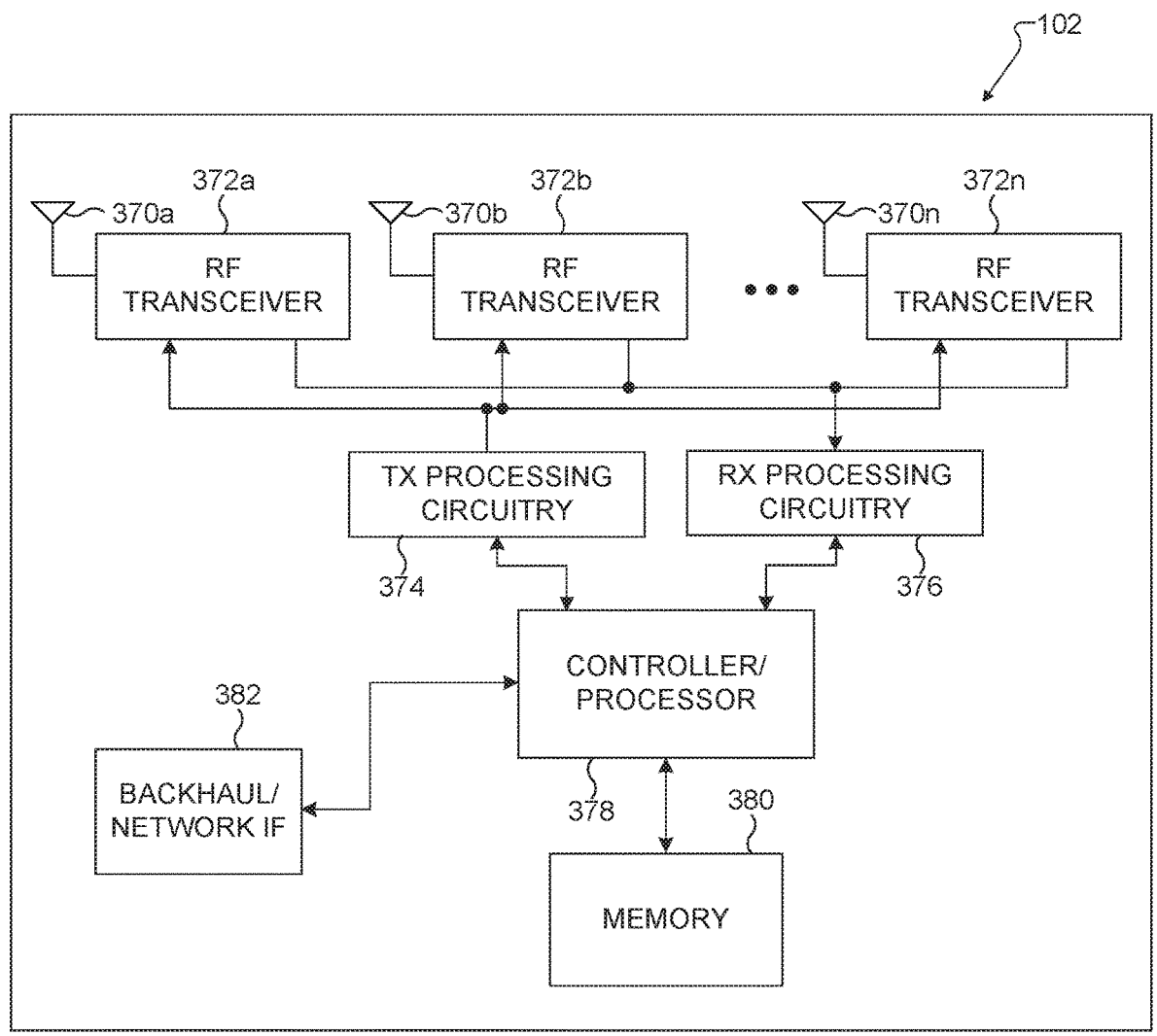
FIG. 3B illustrates an example BS according to various embodiments of the present disclosure.

FIG. 3B illustrates an example gNB 102 according to the present disclosure. The embodiment of the gNB 102 shown in FIG. 3B is for illustration only, and other gNBs of FIG. 1 could have the same or similar configuration. However, gNBs come in a wide variety of configurations, and FIG. 3B does not limit the scope of the present disclosure to any particular implementation of a gNB. The gNB 101 and the gNB 103 can include the same or similar structure as the gNB 102.

As shown in FIG. 3B, the gNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The gNB 102 also includes a controller/processor 378, a memory 380, and a backhaul or network interface 382.

The RF transceivers 372a-372n receive, from the antennas 370a-370n, incoming RF signals, such as signals transmitted by UEs or other gNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the gNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. In some embodiments, the controller/processor 378 includes at least one microprocessor or microcontroller.

The controller/processor 378 is also capable of executing programs and other processes resident in the memory 380, such as an OS. The controller/processor 378 is also capable of supporting channel quality measurement and reporting for systems having 2D antenna arrays as described in embodiments of the present disclosure. In some embodiments, the controller/processor 378 supports communications between entities, such as web RTC. The controller/processor 378 can move data into or out of the memory 380 as required by an executing process.

The controller/processor 378 is also coupled to the backhaul or network interface 382. The backhaul or network interface 382 allows the gNB 102 to communicate with other devices or systems over a backhaul connection or over a network. The backhaul or network interface 382 could support communications over any suitable wired or wireless connection(s). For example, when the gNB 102 is implemented as part of a cellular communication system (such as one supporting 5G or new radio access technology or NR, LTE, or LTE-A), the backhaul or network interface 382 could allow the gNB 102 to communicate with other gNBs over a wired or wireless backhaul connection. When the gNB 102 is implemented as an access point, the backhaul or network interface 382 could allow the gNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

The memory 380 is coupled to the controller/processor 378. Part of the memory 380 could include a RAM, and another part of the memory 380 could include a Flash memory or other ROM. In certain embodiments, a plurality of instructions, such as a BIS algorithm is stored in memory. The plurality of instructions are configured to cause the controller/processor 378 to perform the BIS process and to decode a received signal after subtracting out at least one interfering signal determined by the BIS algorithm.

As described in more detail below, the transmit and receive paths of the gNB 102 (implemented using the RF transceivers 372a-372n, TX processing circuitry 374, and/or RX processing circuitry 376) allocate and transmit CSI-RS as well as allocate and receive SRS.

Although FIG. 3B illustrates one example of a gNB 102, various changes can be made to FIG. 3B. For example, the gNB 102 could include any number of each component shown in FIG. 3A. As a particular example, an access point could include a number of backhaul or network interfaces 382, and the controller/processor 378 could support routing functions to route data between different network addresses. As another particular example, while shown as including a single instance of TX processing circuitry 374 and a single instance of RX processing circuitry 376, the gNB 102 could include multiple instances of each (such as one per RF transceiver).

Rel.13 LTE supports up to 16 CSI-RS antenna ports which enable a gNB to be equipped with a large number of antenna elements (such as 64 or 128). In this case, a plurality of antenna elements is mapped onto one CSI-RS port. Furthermore, up to 32 CSI-RS ports will be supported in Rel.14 LTE. For next generation cellular systems such as 5G, it is expected that the maximum number of CSI-RS ports remain more or less the same.

Figure 4:
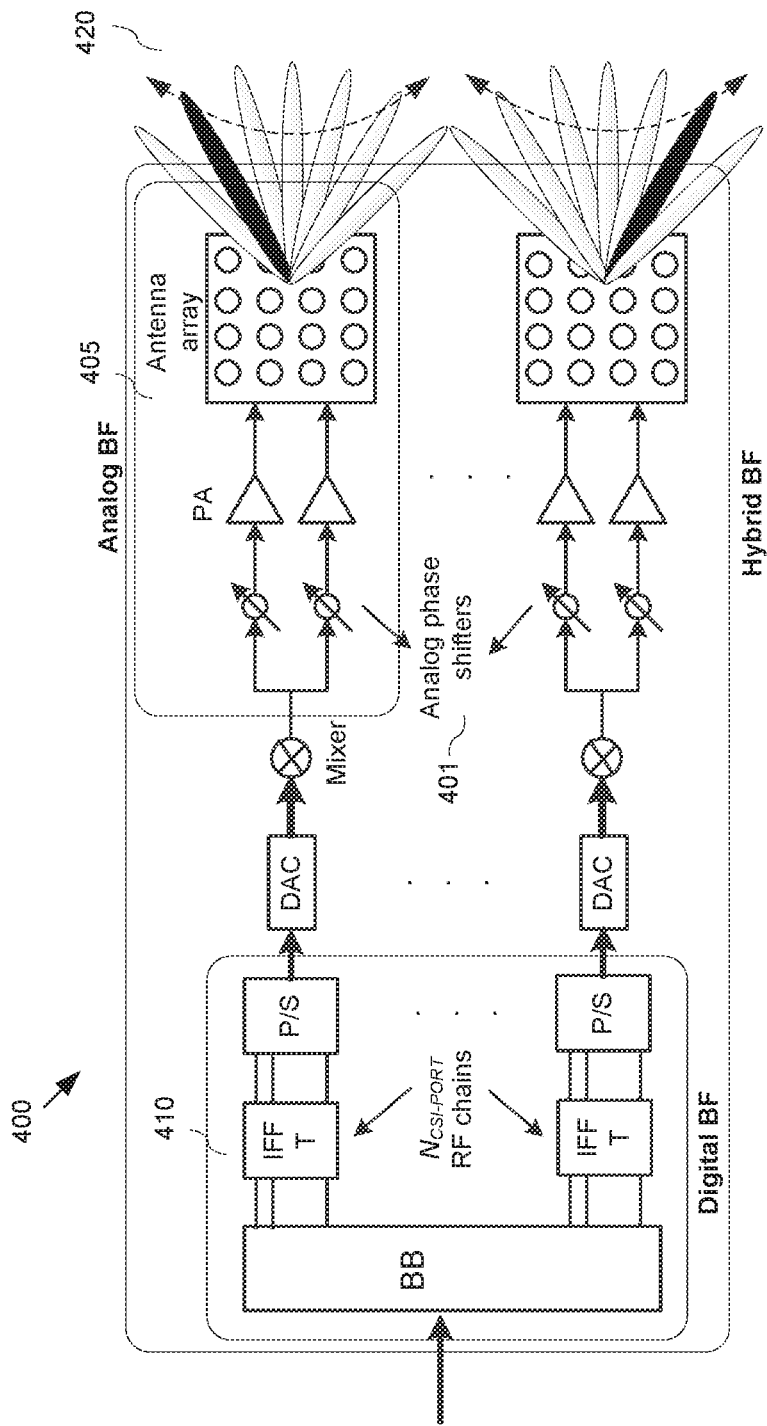
FIG. 4 illustrates an example beamforming architecture wherein one CSI-RS port is mapped onto a large number of analog-controlled antenna elements according to various embodiments of the present disclosure.

For mmWave bands, although the number of antenna elements can be larger for a given form factor, the number of CSI-RS ports—which can correspond to the number of digitally precoded ports—tends to be limited due to hardware constraints (such as the feasibility to install a large number of ADCs/DACs at mmWave frequencies) as illustrated by beamforming architecture 400 in FIG. 4. In this case, one CSI-RS port is mapped onto a large number of antenna elements which can be controlled by a bank of analog phase shifters 401. One CSI-RS port can then correspond to one sub-array which produces a narrow analog beam through analog beamforming 405. This analog beam can be configured to sweep across a wider range of angles 420 by varying the phase shifter bank across symbols or subframes or slots (wherein a subframe or a slot comprises a collection of symbols and/or can comprise a transmission time interval). The number of sub-arrays (equal to the number of RF chains) is the same as the number of CSI-RS ports $N_{CSI-PORT}$. A digital beamforming unit 410 performs a linear combination across $N_{CSI-PORT}$ analog beams to further increase precoding gain. While analog beams are wideband (hence not frequency-selective), digital precoding can be varied across frequency sub-bands or resource blocks.

In LTE, depending on the number of transmission layers, a maximum of two codewords are used for DL and UL data transmissions (on DL data channel such as PDSCH or PDCH, and UL data channel such as PUSCH or PUCH, respectively) for spatial multiplexing. For L=1 layer, one codeword is mapped to one layer (711). For L>1 layers, each of the two codewords (CWs) is mapped to at least one layer (712) where L layers (rank-L) are divided almost evenly across the two codewords (CWs). In addition, one codeword (CW) can also be mapped to >1 layers especially when only one of the two codewords (CWs) is to be retransmitted.

Although beneficial for facilitating modulation-and-coding-scheme (MCS) adaptation per codeword (CW) and MMSE-SIC (MMSE with successive interference cancellation) receiver, it costs some significant overhead over a single codeword (CW) mapping. DL overhead comes from the additional DCI payload due to 2 fixed MCS fields and 2 fixed NDI-RV (DL HARQ related) fields. UL overhead comes from the need for two CQIs (full 4-bit+delta 3-bit for wideband CQI, and 2× overhead for subband CQI) for rank>1 and two DL HARQ-ACKs for rank>1. Added to that is the complexity of having to accommodate more than one layer-mapping schemes in case of retransmission. Furthermore, when distributed MIMO such as non-coherent joint transmission (NC-JT) is incorporated into design requirements for 5G NR, the number of codewords (CWs) used for DL and UL transmissions per UE can increase with the number of TRPs. Therefore, using only one CW per PDSCH/PUSCH assignment per UE is beneficial for NR, at least for up to rank-4 transmission. Else, two-CW per PDSCH/PUSCH assignment per UE can be used for higher ranks.

Therefore, there is a need for a different design for CQI and its associated uplink control information (UCI) multiplexing schemes when a single codeword (CW) is mapped to all the L≥1 transmission layers.

In addition, to accommodate diverse use cases and deployment scenarios for NR, a single design for CQI (such as a fixed number of bits) is likely sub-optimal. For instance, in many deployment scenarios (such as homogeneous macro/micro-cell networks), network performance is typically interference-limited just as the case for LTE. However, in some other scenarios (such as small-cells with interference coordination or COMP), significantly improved geometry distribution can occur (as inter-cell interference is lessened). In this case, the highest modulation order assigned for DL transmission is expected to be 256QAM. When inter-cell interference is lower, the network may also benefit from higher-resolution CSI. On the other hand, higher-order QAM modulation is inapplicable for low-cost UEs.

Therefore, there is also a need for a more flexible and configurable CQI design which can accommodate various scenarios in NR such as those identified above.

In LTE and NR, the payload of aperiodic CSI (A-CSI) depends on RI and/or CRI for the following reasons. First, codebook sizes can vary with RI which can impact the PMI bitwidth. Second, the number of codewords (CWs) can vary with RI. For LTE, one-CW transmission is assumed for RI=1, else two-CW transmission is assumed for RI>1. For NR, one-CW transmission is assumed for RI≤4, else two-CW transmission is assumed for RI>4. The number of CWs corresponds to the number of CQIs. For instance, for one report per CQI reporting band ("wideband" or "partial band"), one CQI is needed per CW. Third, if a UE is configured with multiple non-zero-power (NZP) CSI-RS resources and to report CRI, RI/PMI/CQI payload can depend on the value of CRI if the number of ports associated with different CSI-RS resources varies. Therefore, for LTE, RI/CRI is positioned at a different location from PMI/CQI so that it can be decoded first.

For NR, two-part UCI is used wherein the first part includes RI/CRI and CQI for the first CW. For Type II CSI, additional information such as the number of non-zero amplitude coefficients for the two layers is also included in the first part. That is, the payload of the first part remains the same given higher-layer configuration whereas the payload of the second part varies with RI/CRI. However, there are conditions where the payload of the second part does not depend on the content of the first part. In such scenarios, the use of two-part UCI can be simplified.

Therefore, there is also a need for a different design for uplink control information (UCI) multiplexing schemes when the payload of the second part does not depend on the content of the first part. Here, UCI includes reporting parameters associated with CSI acquisition, such as CQI (channel quality indicator), PMI (precoding matrix index), RI (rank indicator), and CRI (CSI-RS resource index/indicator). Other CSI parameters can also be included. Unless otherwise stated, this UCI does not include HARQ-ACK. In the present disclosure, this UCI can also be referred to as CSI-UCI for illustrative purposes.

The present disclosure includes the following components. A first component of the present disclosure pertains to configurable CQI design. A second component pertains to extending the first component for multi-CW scenarios. A third component pertains to extending the first and/or the second component for subband reporting (that is, when one CQI is calculated and reported for each subband). A fourth component pertains to condition(s) wherein a simplified design for UCI multiplexing can be used. A fifth component pertains to UCI multiplexing schemes which can be used to simplify the two-part design when the payload of the second part does not depend on the content of the first part.

Each of these components can be used either by itself (without the other component) or in conjunction with at least one of the other component. Likewise, each of these components includes a plurality of sub-components. Each of the sub-components can be used either by itself (without any other sub-component) or in conjunction with at least one of the other sub-components. For instance, any example embodiment of the fourth component (condition of usage of a UCI multiplexing scheme) can be combined with any example embodiment of the fifth component (UCI multiplexing scheme).

All the following components and embodiments are applicable for UL transmission with CP-OFDM (cyclic prefix OFDM) waveform as well as DFT-SOFDM (DFT-spread OFDM) and SC-FDMA (single-carrier FDMA) waveforms. Furthermore, all the following components and embodiments are applicable for UL transmission when the scheduling unit in time is either one subframe (which can include one or multiple slots) or one slot, wherein one subframe or slot can comprise a transmission time interval.

In the present disclosure, the frequency resolution (reporting granularity) and span (reporting bandwidth) of CSI reporting can be defined in terms of frequency "subbands" and "CSI reporting band" (CRB), respectively.

A subband for CSI reporting is defined as a set of contiguous PRBs which represents the smallest frequency unit for CSI reporting. The number of PRBs in a subband can be fixed for a given value of DL system bandwidth, configured either semi-statically via higher-layer/RRC signaling, or dynamically via L1 DL control signaling or MAC control element (MAC CE). The number of PRBs in a subband can be included in CSI reporting setting.

"CSI reporting band" is defined as a set/collection of subbands, either contiguous or non-contiguous, wherein CSI reporting is performed. For example, CSI reporting band can include all the subbands within the DL system bandwidth. This can also be termed "full-band". Alternatively, CSI reporting band can include only a collection of subbands within the DL system bandwidth. This can also be termed "partial band".

The term "CSI reporting band" is used only as an example for representing a function. Other terms such as "CSI reporting subband set" or "CSI reporting bandwidth" can also be used.

In terms of UE configuration, a UE can be configured with at least one CSI reporting band. This configuration can be semi-static (via higher-layer signaling or RRC) or dynamic (via MAC CE or L1 DL control signaling). When configured with multiple (N) CSI reporting bands (e.g. via RRC signaling), a UE can report CSI associated with n≤N CSI reporting bands. For instance, >6 GHz, large system bandwidth may require multiple CSI reporting bands. The value of n can either be configured semi-statically (via higher-layer signaling or RRC) or dynamically (via MAC CE or L1 DL control signaling). Alternatively, the UE can report a recommended value of n via an UL channel.

Therefore, CSI parameter frequency granularity can be defined per CSI reporting band as follows. A CSI parameter is configured with "single" reporting for the CSI reporting band with $M_n$ subbands when one CSI parameter for all the $M_n$ subbands within the CSI reporting band. A CSI parameter is configured with "subband" for the CSI reporting band with $M_n$ subbands when one CSI parameter is reported for each of the $M_n$ subbands within the CSI reporting band.

Figure 5:
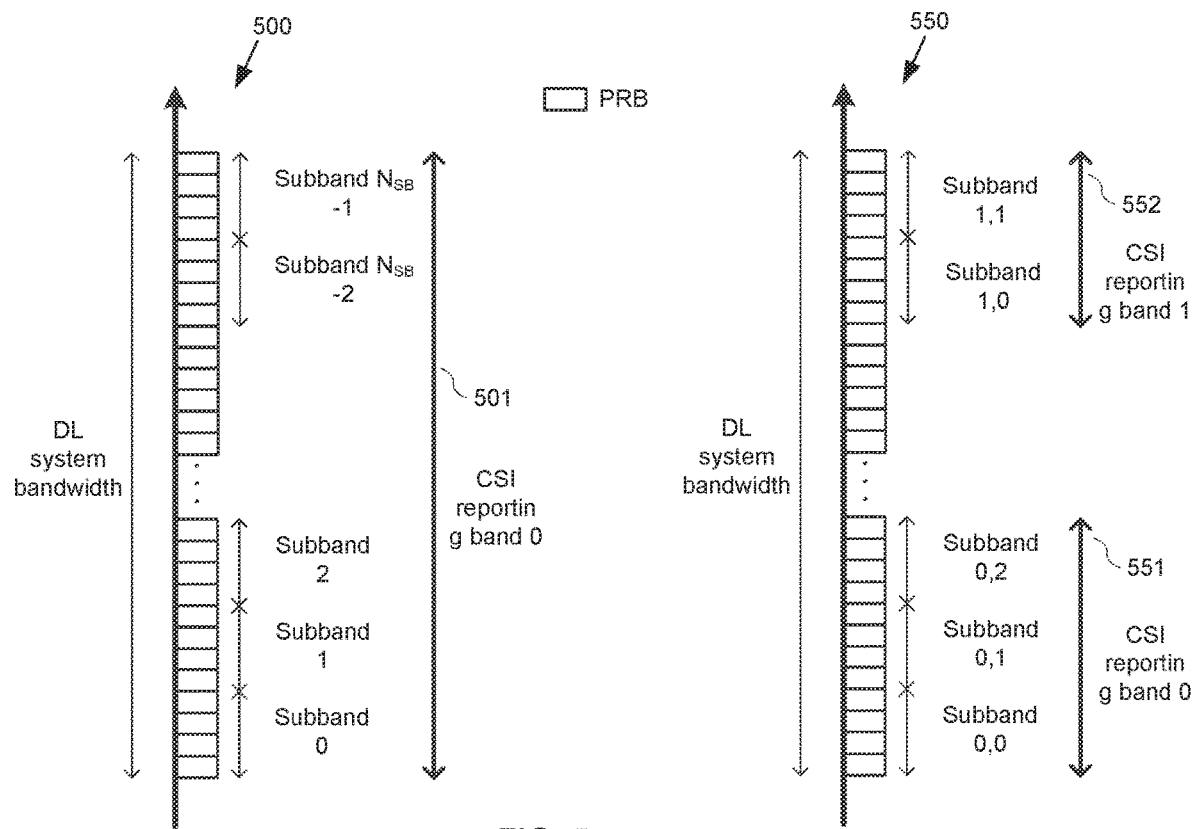
FIG. 5 illustrates examples of CSI reporting subband according to an embodiment of the present disclosure.

FIG. 5 illustrates several examples of CSI reporting band configuration. In these examples, one subband includes 4 PRBs. In a first example illustrated by band configuration 500, a UE is configured with one CSI reporting band 0 (501) which spans the entire DL system bandwidth (including $N_{SB}$ subbands). In a second example illustrated by band configuration 550, a UE is configured with two CSI reporting bands. The first CSI reporting band 0 (551) includes 3 subbands while the second CSI reporting band 1 (552) includes 2. For band configuration 550, a UE can be further configured or requested to report CSI for either reporting band (551 or 552) or both. The two reporting bands can be associated with one common/joint CSI reporting setting or two separate CSI reporting settings. Consequently, the two CSI reporting bands can be associated with different configurations (such as frequency granularity, periodic/semi-persistent/aperiodic) or different RS settings for CSI acquisition.

For the first component (that is, configurable CQI design), in one embodiment (I.1), the CQI bit-width (the number of bits per CQI report) can be configured for a UE. Given a set of supported bit-widths $\{N_0, N_1, \ldots, N_{M-1}\}$, a UE can be configured with an N-bit CQI where $N \in \{N_0, N_1, \ldots, N_{M-1}\}$. For example, M can be 2 and the set is {4,5}. Or optionally, M can be 2 and the set is {2, 4}. Or optionally, M can be 3 and the set is {2, 4, 5}.

The value of N can be configured semi-statically via higher-layer signaling. Or optionally, it can be configured via MAC control element (CE) signaling or L1 control signaling (via DCI).

The benefit for configurable CQI bit-width is two-fold. First, depending on use cases and deployment scenarios, a suitable performance-overhead trade-off can be attained from setting the CQI resolution. For example, as previously discussed, high-resolution CQI is unlikely to offer significant performance gain in interference-limited scenario. In this case, reducing UL control overhead can be done without incurring measurable DL throughput loss.

In one sub-embodiment (I.1.1), a given bit-width of N is associated with one (unique) CQI table, i.e. mapping between the $2^N$ code points and CQI values as illustrated in TABLE 1. A CQI value represents a DL link quality. Some examples include recommended spectral efficiency (in bps/Hz), highest recommended spectral efficiency (in bps/Hz) for a given set of constraints (such as 10% BLER within a pre-defined or configurable observation interval), or a signal-to-noise-interference-ratio (SINR). Spectral efficiency can be further associated with modulation (e.g. QPSK, 16QAM, 64QAM, 256QAM, and/or 1024QAM) and channel coding rate. In the example of TABLE 1, only three modulation schemes are used (QPSK, 16QAM, and 64QAM with $P_1$, $P_2$, and $P_3$ code points, respectively). the channel coding rate can be inferred from spectral efficiency divided (normalized) by the number of bits per symbol associated with the modulation scheme (2 bits/symbol for QPSK, P bits per symbol for $2^P$-QAM). In this sub-embodiment, there is a one-to-one correspondence between CQI bit-width and a CQI table. Although not necessarily so, the values of spectral efficiencies can increase monotonically with the code point values. That is, $S_{1,0} < S_{1,1} < \ldots < S_{1,P_1-1} < S_{2,0} < S_{2,1} < \ldots < S_{2,P_2-1} < S_{3,0} < S_{3,1} < \ldots < S_{3,P_3-1}$. In this case, channel coding rates for code point 0, $P_1$, $P_1+P_2$, and $P_1+P_2+P_3$ are $$\frac{S_{1,0}}{2}, \frac{S_{2,0}}{4}, \text{ and } \frac{S_{3,0}}{6},$$

respectively.

Therefore, in this sub-embodiment, when N distinct bit-widths are used, N distinct CQI tables are supported. From the example in TABLE 1, it is evident instead of using N separately designed/defined CQI tables, the N CQI tables can also be derived from N subsets of one "master" CQI table if all the spectral efficiency values from each of the N tables are taken from a common "master" set of spectral efficiency values.

TABLE 1

| Code point | Spectral efficiency (bps/Hz) | Modulation scheme |
|---|---|---|
| 0 | $S_{1,0}$ | QPSK |
| ... | ... | ... |
| $P_1 - 1$ | $S_{1, P_1 - 1}$ | QPSK |
| $P_1$ | $S_{2, 0}$ | 16QAM |
| ... | ... | ... |
| $P_1 + P_2 - 1$ | $S_{2, P_2 - 1}$ | 16QAM |
| $P_1 + P_2$ | $S_{3, 0}$ | 64QAM |
| ... | ... | ... |
| $P_1 + P_2 + P_3 - 1$ | $S_{3, P_3 - 1}$ | 64QAM |

For the above examples, different bit-widths can comprise different sets of modulation schemes. For instance, with M=2 and the bit-width set of {4, 5}, a first CQI table can comprise {QPSK, 16QAM, 64QAM} while a second CQI table can comprise {QPSK, 16QAM, 64QAM, 256QAM, 1024 QAM}. Or optionally with M=2 and the bit-width set of {2, 4}, a first CQI table can comprise {QPSK} while a second CQI table can comprise {QPSK, 16QAM, 64QAM}. Or optionally with M=3 and the bit-width set of {2, 4, 5}, a first CQI table can comprise {QPSK}, a second CQI table can comprise {QPSK, 16QAM, 64QAM}, and a third CQI table can compromise {QPSK, 16QAM, 64QAM, 256QAM, 1024 QAM}. If required/target BLER value is used as a reference for calculating CQI, different CQI tables associated with different bitwidths (payload sizes) can also be associated with different required/target BLER values. If several target BLER values are possible, this required/target BLER can be configured, that is, selected from a set of possible values.

In another sub-embodiment (I.1.2), a given bit-width of N can be associated with one (unique) CQI table (i.e. mapping between the $2^N$ code points and CQI values) or multiple CQI tables. In case of multiple CQI tables for a given bit-width of N, all the associated CQI tables can have the same number of code points (hypotheses), but the sets of spectral efficiency values (along with the corresponding modulation schemes) can be different. If required/target BLER value is used as a reference for calculating CQI, different CQI tables associated with different bitwidths (payload sizes) can also be associated with different required/target BLER values or the same (single) required/target BLER value. If several target BLER values are possible, this required/target BLER can be configured, that is, selected from a set of possible values.

In a variation of this sub-embodiment, only one bit-width is used (for example, 4 bits) but multiple CQI tables are associated with this single bit-width.

For the above embodiments and sub-embodiments, instead of associating different mapping schemes between code points and spectral efficiencies with the number of bits (bit-widths), all the applicable mapping schemes can be enumerated as "scheme 1", "scheme 2", and so on.

Figure 6:
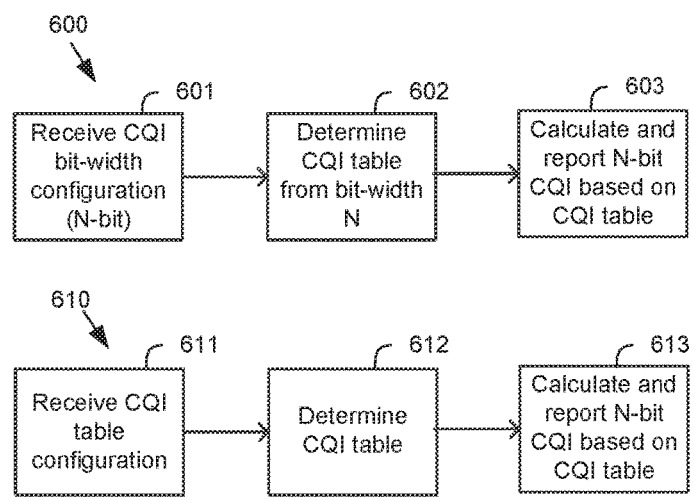
FIG. 6 illustrates an example embodiment of CQI calculation and reporting according to an embodiment of the present disclosure.

Flowcharts 600 and 610 of FIG. 6 illustrate UE procedures associated with the above embodiments wherein receipt of a CQI bit-width configuration (step 601) or CQI table configuration (step 611) and determination of the CQI table (or scheme) (steps 602 and 612) determine the manner in which the N-bit CQI is calculated and reported based on the CQI table (steps 603 and 613). As described above, the configuration information can be signaled dynamically (via L1 control signaling or MAC control element) or semi-statically (via higher-layer signaling).

Any of the above embodiments and sub-embodiments can be applied to cases where only one CQI is reported. Such cases include, but are not limited to, CQI reporting associated with single CW transmission hypothesis.

Optionally, any of the above embodiments and sub-embodiments can be applied to cases where two CQIs are reported in case of two-CW transmission hypothesis. Here, each of the two CQIs corresponds to one of two CWs. In this case, the embodiment or sub-embodiment can be applied to at least one of the two CQIs. For example, when applied only to one of the two CQIs, it is used for the CQI associated with the first of the two CWs (which can be termed the "base CQI").

For the second component (that is, configurable CQI design extension for multi-CW scenarios), in one embodiment (II.1), when a UE is configured with receiving up to two CWs, the UE can report either one CQI or two CQIs depending on the value of rank indicator (RI). For example, if one-CW transmission is used for up to 4-layer transmission and two-CW otherwise, the UE reports one CQI (associated with one CW) when RI≤4. Else, the UE reports two CQIs (associated with two CWs) when RI>4.

For this example embodiment, when RI≤4, the single CQI reported by the UE can be defined according to any of the embodiments or sub-embodiments of component 1. When RI>4, the first CQI reported by the UE can be defined according to any of the embodiments or sub-embodiments of component 1. Two example sub-embodiments for the second CQI (for the second CW) are given as follows.

In one sub-embodiment (II.1.1), the second CQI reported by the UE can be defined according to any of the embodiments or sub-embodiments of component and the second CQI is of the same bit-width as the first CQI. In a variation of this sub-embodiment, the second CQI is of the same CQI table as the first CQI. In another variation of this sub-embodiment, the second CQI can be assigned a different CQI table from the first CQI despite having the same bit-width.

In another sub-embodiment (11.1.2), the second CQI reported by the UE is assigned a smaller bit-width than the one assigned for the first CQI. In this case, the second CQI is defined differentially relative to the first CQI. In one example, the bit-width difference between the first CQI and the second CQI is fixed to be A. In that case, if the first CQI is configured with a bit-width of N, the bit-width for the second CQI is (N−Δ). For instance, Δ can be fixed as 1. Or it can be fixed as 2. In another example, the bit-width difference Δ between the first CQI and the second CQI can be configured, either dynamically (via L1 control signaling or DCI, or MAC control element) or semi-statically (via higher-layer or RRC signaling). In this case, A can take one out of multiple values (such as 1 or 2).

For this sub-embodiment, with the smaller bit-width for the second CQI (N−Δ), the second CQI can be defined as an increment, decrement, or zero shift relative to the first CQI. An example is depicted in TABLE 2A and 2B where N=4 and Δ=2 (which implies that the bit-width of the second CQI is 4−2=2). $CQI_1$ and $CQI_2$ denote the code points associated with the first and the second CQI, respectively. The maximum and minimum are used to ensure that the code point for the second CQI is valid (i.e. from 0 to $2^N-1$). It is assumed that all the code points are fully utilized (i.e. no 'reserved' fields).

In a variation of this sub-embodiment, rather than configuring N and A, (which implies bit-width of N and (N−Δ) for the first and second CW, respectively), the bit-width for the first and the second CW can be configured directly (for instance, $N_1$ and $N_2$ where $N_1 > N_2$).

TABLE 2A

| differential CQI, example | |
|---|---|
| Code point | $CQI_2$ (code point) |
| 0 | $CQI_1 - 1$, or max($CQI_1 - 1,0$) |
| 1 | $CQI_1$ |
| 2 | $CQI_1 + 1$, or min($CQI_1 + 1, 2^N - 1$) |
| 3 | $CQI_1 + 2$, or min($CQI_1 + 1, 2^N - 1$) |

TABLE 2B

| differential CQI, example | |
|---|---|
| Code point | $CQI_2$ (code point) |
| 0 | $CQI_1 - 2$, or max($CQI_1 - 1,0$) |
| 1 | $CQI_1 - 1$, or max($CQI_1 - 1,0$) |
| 2 | $CQI_1$ |
| 3 | $CQI_1 + 1$, or min($CQI_1 + 1, 2^N - 1$) |

In this sub-embodiment, CQI feedback overhead can be reduced.

For the above embodiments and sub-embodiments, instead of associating different mapping schemes between code points and spectral efficiencies with the number of bits (bit-widths), all the applicable mapping schemes can be enumerated as "scheme 1", "scheme 2", and so on.

Figure 7:
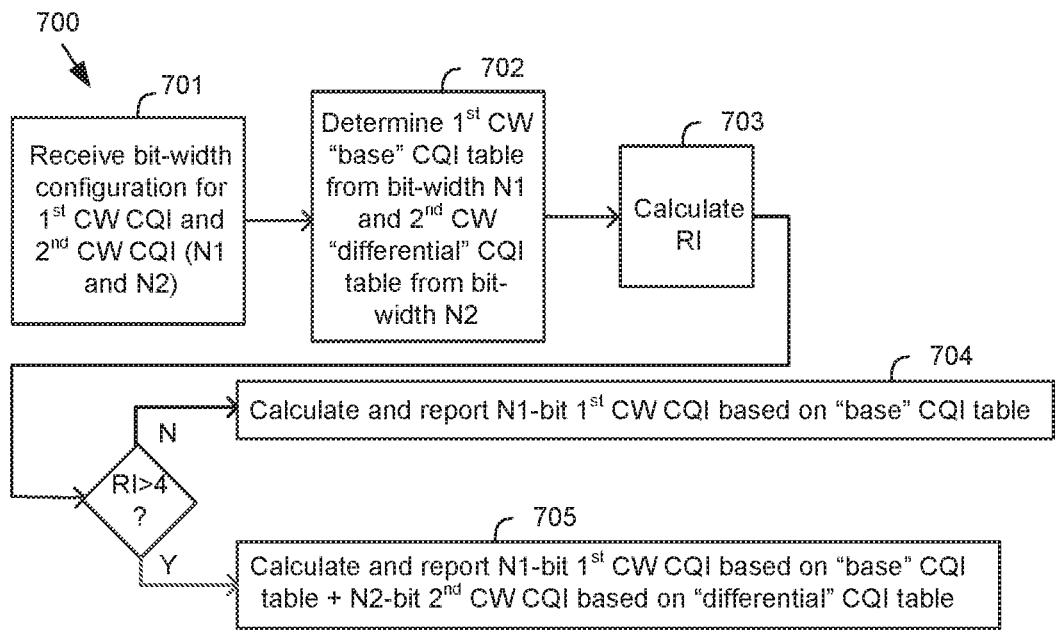
FIG. 7 illustrates an example of CQI calculation for two-CW transmission according to an embodiment of the present disclosure.
Figure 8:
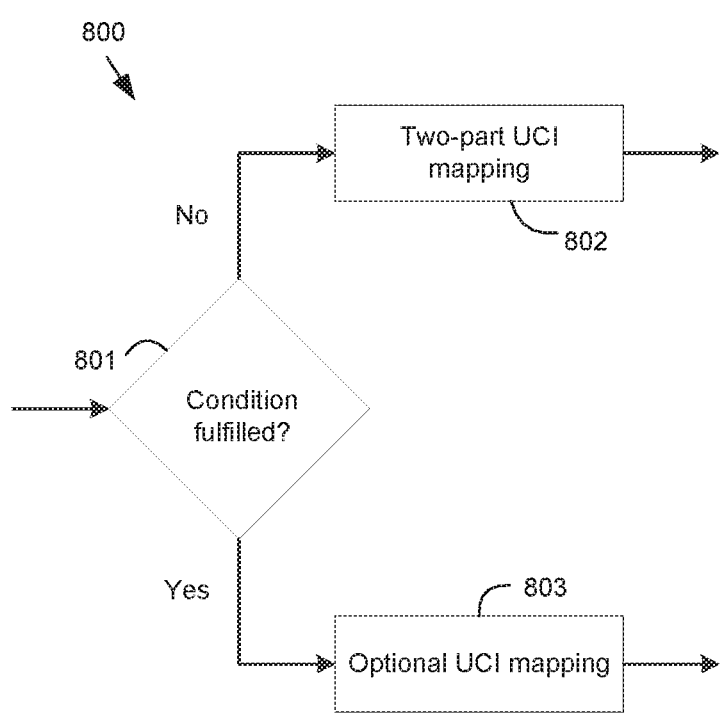
FIG. 8 illustrates an example of UCI mapping rule according to an embodiment of the present disclosure.
Figure 9A:
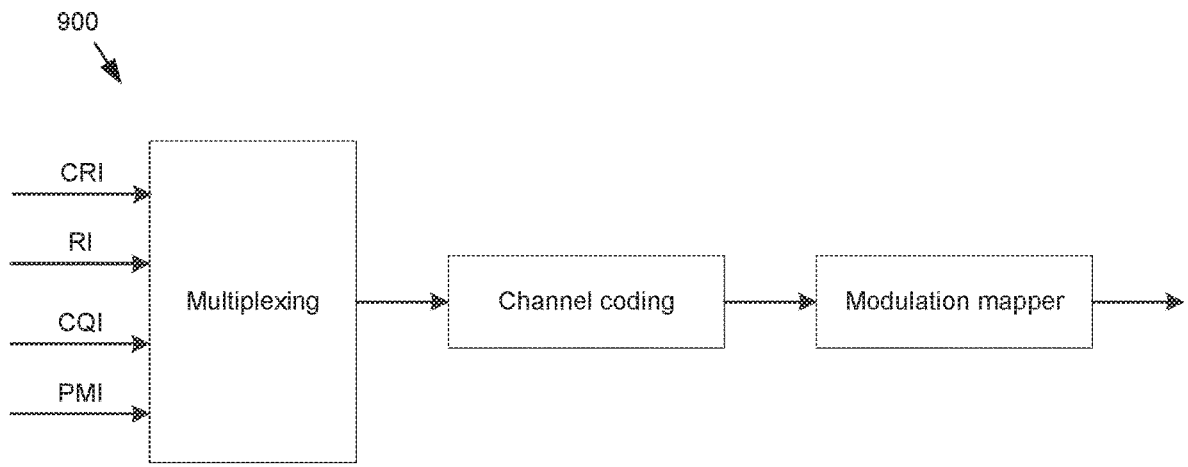
FIGS. 9A-E illustrate examples of one-part UCI mapping according to an embodiment of the present disclosure.
Figure 9B:
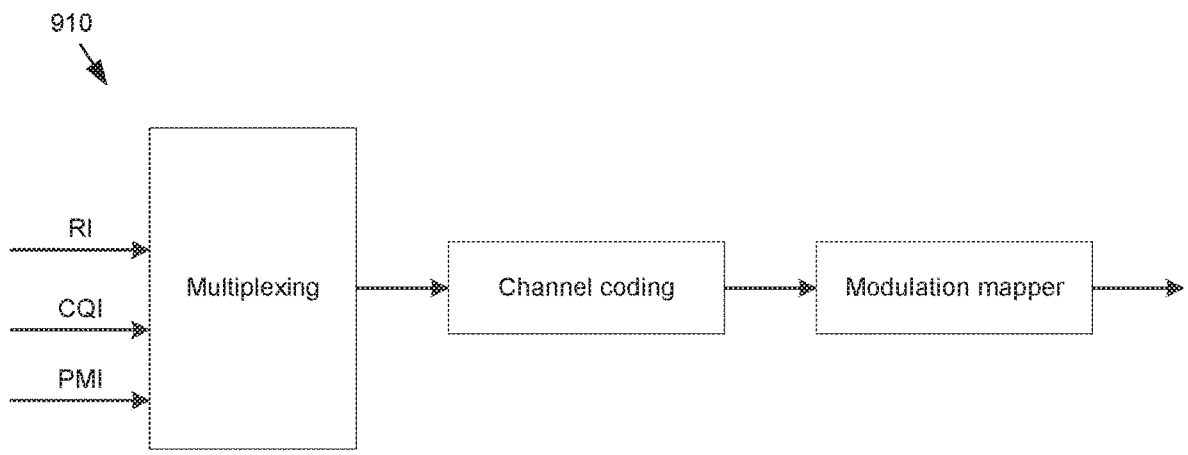
Figure 9C:
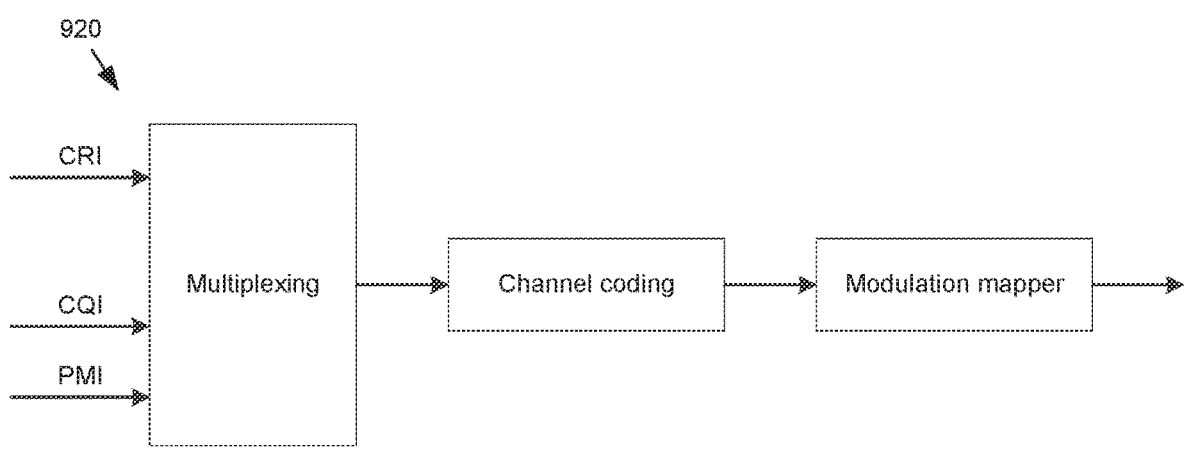
Figure 9D:
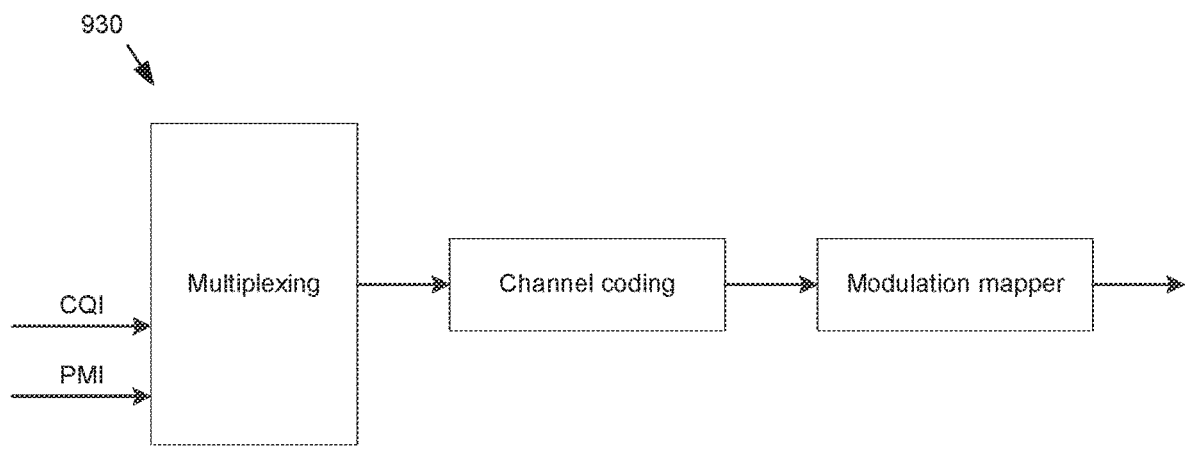
Figure 9E:
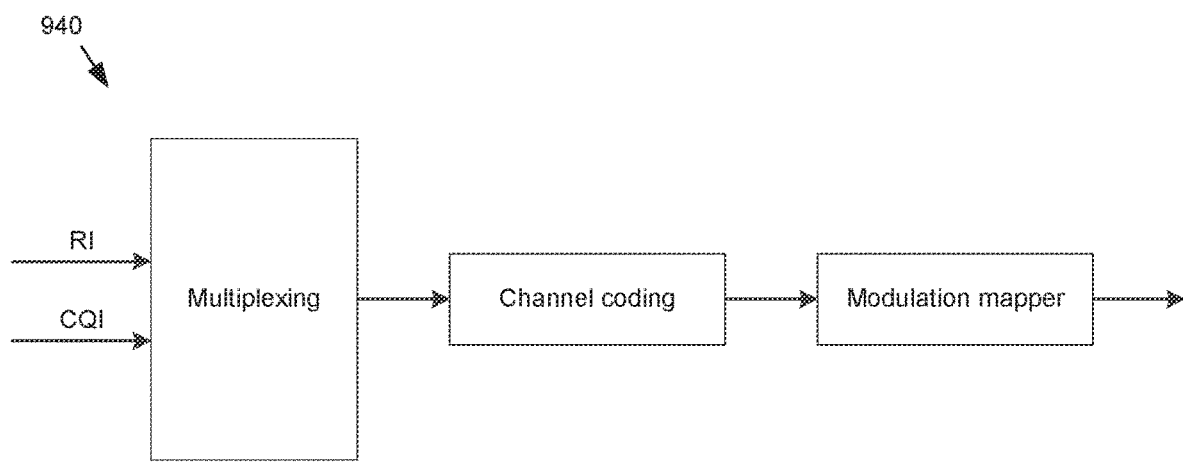

FIG. 7 illustrates a flowchart for example UE procedure 700 for sub-embodiment II.1.2. In this example, the bit-width configuration for the first and second CW CQIs is received (step 701). The UE then determines the first CW "base" CQI table from bit-width N1 and second CW "differential" CQI table from bit-width N2 (step 702) and calculates the RI (step 703). Thereafter, for RI≤4, the UE calculates and reports the N1-bit first CW CQI based on "base" CQI table (step 704); and for RI>4, the UE calculates and reports the N1-bit first CW CQI based on "base" CQI table and the N2-bit second CW CQI based on "differential" CQI table (step 705). In other words, it is also assumed that 1-CW transmission hypothesis is associated with whereas 2-CW transmission hypothesis is associated with RI>4.

For the third component (that is, configurable CQI design extension for subband reporting), embodiments in component 1 and 2 are applicable in scenarios where wideband or partial band CQI is reported (that is, one CQI is reported for all the subbands within the configured reporting band—previously described). When subband CQI is reported (that is, one CQI is reported for each of the subbands within the configured reporting band), extension to embodiments in component 2 can be used. This extension applies whether one- or two-CW hypothesis is used.

In one embodiment (III.1), when a UE is configured with subband CQI reporting and one-CW hypothesis is used, the CQI reported by the UE for each subband can be defined according to any of the embodiments or sub-embodiments of component 1. In this case, when the reporting band includes $N_{SB}$ subbands, $N_{SB}$ CQIs are reported wherein all these CQIs are associated with a same bit-width and a same CQI table (cf. TABLE 1).

In another embodiment (III.2), when a UE is configured with subband CQI reporting and one-CW hypothesis is used, the CQI reported by the UE for each subband can be defined as given in the following examples.

In one example (III.2.1), when the reporting band includes $N_{SB}$ subbands, $N_{SB}$ CQIs are reported wherein one of the CQIs is defined/reported just as in component 1 ("full" CQI) while the other ($N_{SB}-1$) CQIs are defined/reported as differential CQIs (with bit-width of (N−Δ) following component 2).

In another example (III.2.2), when the reporting band includes $N_{SB}$ subbands, $N_{SB}$ CQIs are reported wherein these CQIs are defined/reported as differential CQIs (with bit-width of (N−Δ) following component 2) relative to a reference CQI. The reference CQI can be the single CQI which represents all the subbands within the CQI reporting band (that is, wideband CQI or partial band CQI). Therefore, a total of ($N_{SB}+1$) values are reported.

In another embodiment (III.3), when a UE is configured with subband CQI reporting, the reporting band includes $N_{SB}$ subbands, and two-CW hypothesis is used, the CQI reported by the UE for each subband can be defined as given in the following examples.

In one example (III.3.1), the set of $N_{SB}$ CQIs (III.2.1) or ($N_{SB}+1$) CQIs (III.2.2) for the first CW and the second CW are assigned the same definition, bit-width, and CQI table.

In another example (III.3.2), the reference CQI for the second CW is defined as a differential CQI relative to the reference CQI for the first CW following any of the embodiments in component 2. This reference CQI can be a designated CQI (III.2.1) or a single CQI calculated for all the subbands within the CQI reporting band (III.2.2).

The fourth component (that is, UCI multiplexing) entails a condition for utilizing an optional UCI multiplexing scheme (e.g. one of the schemes in component 2 below) instead of the two-part UCI scheme currently supported for NR as described above. That is, if the condition is fulfilled, the optional scheme (e.g. one of the schemes in component 2 below) is used. Otherwise, the two-part UCI scheme currently supported for NR is used.

In one example embodiment (IV.1), the condition includes the UE configured not to report (or, not configured to report) RI. This can correspond to other condition(s) such as the maximum number of layers is configured as one, or rank restriction to only one RI value is configured, etc.

In another example embodiment (IV.2), the condition includes the UE configured not to report (or, not configured to report) CRI. This can correspond to other condition(s) such as the number of configured NZP CSI-RS resources is 1.

In another example embodiment (IV.3), the condition includes the UE configured to report RI with a maximum of no more than 4. This can correspond to other condition(s) such as the UE configured to receive a maximum of 4 layers. In a variation of this embodiment, the UE can be configured with a rank restriction with at least two RI values where the largest RI value is ≤4. In this case, (in case of subband reporting) only one CQI per subband or, (in case of a single report per CQI reporting band) only one CQI report per CQI reporting band) is reported. Therefore, CQI payload does not depend on RI.

In another example embodiment (IV.4), the condition includes the UE configured for reporting CRI but the number of CSI-RS ports for all the configured NZP CSI-RS resources is the same. Therefore, CQI/PMI payload remains the same as CRI changes.

In another example embodiment (IV.5), the condition includes the UE configured not to report (or, not configured to report) PMI. Therefore, only CQI (possibly along with RI and/or CRI) is reported. If this condition is used together with at least one of the previous four embodiments (for instance, embodiment 1.3), the resulting CQI payload can remain the same.

In another example embodiment (IV.6), the condition includes the payload of at least CQI and/or PMI. For example, the total payload of CQI/PMI is below a certain (pre-determined or higher-layer configured) value.

In another example embodiment (IV.7), the condition includes the frequency granularity of CSI reporting. For example, the UE is configured with one report for all the subbands in the CQI reporting band (that is, either "wideband" or "partial band" reporting).

In another example embodiment (IV.8), the condition includes the number of A-CSI reports triggered/requested. This number can correspond to the number of component carriers (CCs), cells, panels, and/or transmit-receive points (TRPs). If the number is 1, or smaller than a certain (pre-determined or higher-layer configured) value, a UCI multiplexing scheme in component 2 is used instead of the currently supported one as described above.

Any two or more of the above example embodiments can be combined (with "and" or "or") to derive another example embodiment on usage condition for a UCI multiplexing scheme in component 5.

For the fifth component (that is, one-part UCI multiplexing), as previously described, any example embodiment of the first component (condition of usage of a UCI mapping or multiplexing scheme) can be combined with any example embodiment of the second component (optional UCI mapping or multiplexing scheme). This can be illustrated in diagram 800 of FIG. 8. The "two-part UCI mapping" (at step 802) signifies the currently supported two-part mapping. This is used when a condition (determined at step 801) is not fulfilled. Else, the "optional UCI mapping" (at step 803) is used.

It should be noted that, if the UE is configured to report both CRI and RI, the value of CRI can affect the possible set of RI values (hence the number of bits needed to signal RI) if different NZP CSI-RS resources are configured with different number of ports. Since both CRI and RI are multiplexed in the same part/segment in either of the two mapping/multiplexing schemes, the combined payload of CRI and RI needs to be kept the same. A solution to this issue is to set the number of bits (payload) for RI to correspond to the CSI-RS resource with the largest number of ports. Optionally, the number of bits (payload) for RI can be set according to the maximum number of DL layers the UE can receive. Optionally, rank restriction can be used. Any combination of these solutions can also apply.

Several example embodiments for the optional UCI mapping or multiplexing scheme (step 803) can be described as follows.

In one example embodiment (V.1), one-part UCI can be used instead of two-part UCI for A-CSI reporting on PUSCH. FIGS. 9A-E describe several example embodiments wherein different combinations of CSI parameters are reported. For example, in diagram 900, the UE is configured to report each of CRI, RI, CQI, and PMI. In diagram 910 and 930, the UE is configured not to report (or, is not configured to report) CRI whereas in 920 and 930 the UE is configured not to report (or, is not configured to report) RI. In diagram 940, the UE is configured not to report PMI.

In a variation of this embodiment, the total payload of this one-part reporting/UCI multiplexing remains the same for a given higher-layer configuration. In another variation of this embodiment, when RI and/or CRI are reported, the total payload of this one-part reporting/multiplexing can vary depending on the value of CRI and/or RI (if the UE is configured to report either CRI or RI or both). In this case, padding bits can be used to keep the payload the same regardless of the value of CRI and/or RI.

For this one-part mapping/multiplexing, the UCI mapping on PUSCH can follow that for part 1 of the current supported two-part scheme. Optionally, the UCI mapping on PUSCH can follow that for part 2 of the current supported two-part scheme.

In another example embodiment (V.2), the same two-part solution as the one currently supported is used except that the payload of part 2 is kept the same for a given RRC configuration. If the payload for part 2 can vary depending on the value of CRI and/or RI (if the UE is configured to report either CRI or RI or both), padding bits can be used to keep the payload the same regardless of the value of CRI and/or RI.

Any of the above variation embodiments can be utilized independently or in combination with at least one other variation embodiment.

Figure 10:
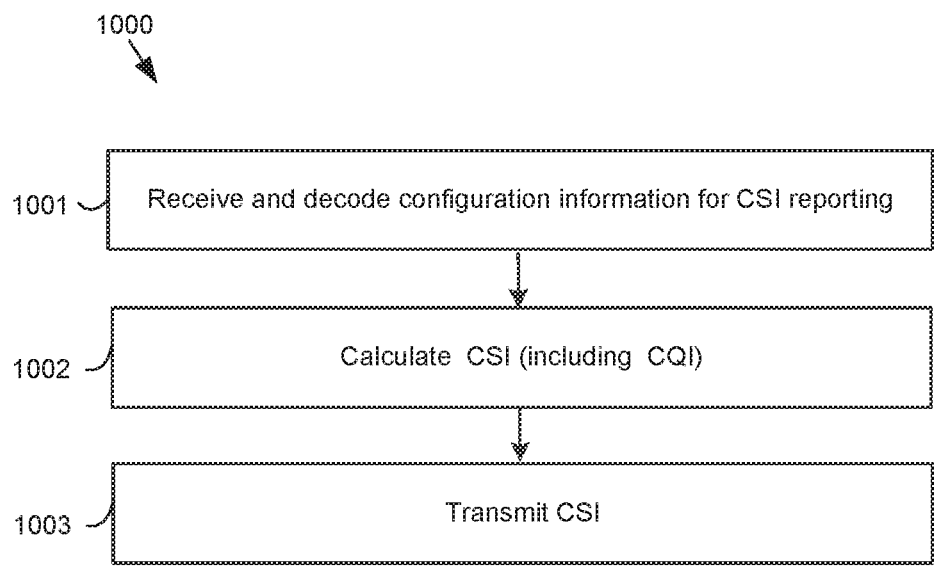
FIG. 10 illustrates a flowchart for an example method wherein a UE receives CSI reporting configuration information according to an embodiment of the present disclosure.

FIG. 10 illustrates a flowchart for an example method 1000 wherein a UE receives and decodes CSI reporting configuration information according to an embodiment of the present disclosure. For example, the method 1000 can be performed by the UE 116.

The method 1000 begins with the UE receiving and decoding configuration information for a channel state information (CSI) reporting (step 1001). The configuration information includes a CQI table selection and a target block error rate (BLER). Following successful decoding of the CSI reporting configuration information, the UE calculates (step 1002) and transmits the CSI (step 1003) that includes a channel quality indicator (CQI). The CQI table can be selected from a plurality of tables and at least two tables are associated with a same CQI payload size and two different sets of modulation-and-coding schemes (MCSs). Here, MCS represents a combination of modulation scheme (such as BPSK, QPSK, 16QAM, 64QAM, and/or 256-QAM) and channel coding rate. Optionally, the CQI table can be selected from a plurality of tables and at least two tables are associated with two different CQI payload sizes.

The at least two tables can be associated with different BLER targets (such as 0.1 or lower for delay-sensitive/URLLC use cases) and one of the payload sizes can be 4 bits.

When calculating and reporting CQI for two-CW transmission, a first CQI is reported when a reported rank indicator (RI) value is 4 or less. In addition, a second CQI is reported when a reported RI value is greater than 4, and the second CQI is of a same payload size as the first CQI.

Figure 11:
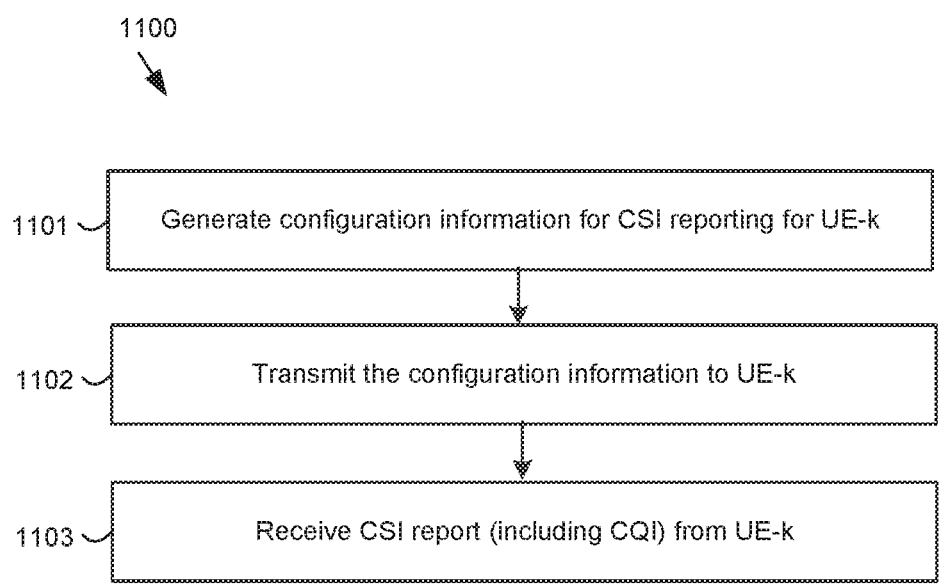
FIG. 11 illustrates a flowchart for an example method wherein a BS generates CSI reporting configuration information for a UE (labeled as UE-k) according to an embodiment of the present disclosure.

FIG. 11 illustrates a flowchart for an example method 1100 wherein a BS generates CSI reporting configuration information for a UE (labeled as UE-k) according to an embodiment of the present disclosure. For example, the method 1100 can be performed by the BS 102.

The method 1100 begins with the BS generating (step 1101) and transmitting (step 1102) configuration information for channel state information (CSI) reporting for a UE (labelled UE-k). The configuration information includes a CQI table selection and a target block error rate (BLER). Subsequently, the BS receives, from UE-k, a CSI report (step 1103) that includes a channel quality indicator (CQI). The CQI table can be selected from a plurality of tables and at least two tables are associated with a same CQI payload size and two different sets of modulation-and-coding schemes (MCSs). Here, MCS represents a combination of modulation scheme (such as BPSK, QPSK, 16QAM, 64QAM, and/or 256-QAM) and channel coding rate. Optionally, the CQI table can be selected from a plurality of tables and at least two tables are associated with two different CQI payload sizes.

The at least two tables can be associated with different BLER targets (such as 0.1 or lower for delay-sensitive/URLLC use cases) and one of the payload sizes can be 4 bits.

When calculating and reporting CQI for two-CW transmission, a first CQI is reported when a reported rank indicator (RI) value is 4 or less. In addition, a second CQI is reported when a reported RI value is greater than 4, and the second CQI is of a same payload size as the first CQI.

Although FIGS. 10 and 11 illustrate examples of methods for receiving configuration information and configuring a UE, respectively, various changes could be made to FIGS. 10 and 11. For example, while shown as a series of steps, various steps in each figure could overlap, occur in parallel, occur in a different order, occur multiple times, or not be performed in one or more embodiments.

Although the present disclosure has been described with an example embodiment, various changes and modifications can be suggested by or to one skilled in the art. It is intended that the present disclosure encompass such changes and modifications as fall within the scope of the appended claims.

What is claimed:

1. A user equipment (UE) comprising:
a transceiver configured to receive configuration information for reporting channel state information (CSI); and
a processor operably connected to the transceiver, the processor configured to decode the configuration information and identify the CSI,
wherein the transceiver is further configured to transmit the CSI including a channel quality indicator (CQI), and wherein:
the configuration information includes a selection of a CQI table associated with a target block error rate (BLER),
a first CQI is reported when a reported rank indicator (RI) value is 4 or less,
when the reported RI value is greater than 4, the first CQI and a second CQI are reported, and
the second CQI is of a same payload size as that of the first CQI.

2. The UE of claim 1, wherein:
the CQI table is selected from a plurality of tables, and
at least two of the tables are associated with a same CQI payload size and different sets of modulation-and-coding schemes (MCSs), respectively.

3. The UE of claim 1, wherein:
the CQI table is selected from a plurality of tables, and
at least two of the tables are associated with different CQI payload sizes.

4. The UE of claim 3, wherein the at least two tables are associated with different BLER targets.

5. The UE of claim 4, wherein one of the payload sizes is 4 bits.

6. A base station (BS) comprising:
a processor configured to generate configuration information for a channel state information (CSI) reporting; and
a transceiver operably connected to the processor, the transceiver configured to:
transmit, to a UE, the configuration information; and
receive, from the UE, a CSI report that includes a channel quality indicator (CQI),
wherein:
the configuration information includes a selection of a CQI table associated with a target block error rate (BLER), a first CQI is reported when a reported rank indicator (RI) value is 4 or less,
when the reported RI value is greater than 4, the first CQI and a second CQI are reported, and
the second CQI is of a same payload size as that of the first CQI.

7. The BS of claim 6, wherein:
the CQI table is selected from a plurality of tables, and
at least two of the tables are associated with a same CQI payload size and different sets of modulation-and-coding schemes (MCSs), respectively.

8. The BS of claim 6, wherein:
the CQI table is selected from a plurality of tables, and
at least two of the tables are associated with different CQI payload sizes.

9. The BS of claim 8, wherein the at least two tables are associated with different BLER targets.

10. The BS of claim 9, wherein one of the payload sizes is 4 bits.

11. A method for operating a user equipment (UE), the method comprising:
receiving and decoding configuration information for reporting channel state information (CSI); and
identifying and transmitting the CSI including a channel quality indicator (CQI);
wherein:
the configuration information includes a selection of a CQI table associated with a target block error rate (BLER), a first CQI is reported when a reported rank indicator (RI) value is 4 or less,
when the reported RI value is greater than 4, the first CQI and a second CQI are reported, and
the second CQI is of a same payload size as that of the first CQI.

12. The method of claim 11, wherein:
the CQI table is selected from a plurality of tables, and
at least two of the tables are associated with a same CQI payload size and different sets of modulation-and-coding schemes (MCSs), respectively.

13. The method of claim 11, wherein:
the CQI table is selected from a plurality of tables, and
at least two of the tables are associated with different CQI payload sizes.

14. The method of claim 13, wherein the at least two tables are associated with different BLER targets.

15. The method of claim 14, wherein one of the payload sizes is 4 bits.

* * * * *